May 10, 1955  H. ALTENBERG  2,707,943
CYLINDER HEADS FOR INTERNAL COMBUSTION ENGINES
Filed Feb. 28, 1951

INVENTOR
Heinrich Altenberg
BY
ATTORNEYS

United States Patent Office 2,707,943
Patented May 10, 1955

2,707,943

CYLINDER HEADS FOR INTERNAL COMBUSTION ENGINES

Heinrich Altenberg, Uhingen, Wurttemberg, Germany, assignor to Porsche Konstruktionen G. m. b. H., Salzburg-Morzg, a company of Austria Application February 28, 1951, Serial No. 213,081

Claims priority, application Austria March 6, 1950

3 Claims. (Cl. 123—32)

This invention relates to improvements in the method of making cast cylinder heads for internal combustion engines having mounted therein a body or structure forming a combustion chamber and to the cast cylinder heads produced by the improved method.

Since the combustion chamber of an injection internal combustion engine represents a considerable portion of the available combustion space for the cylinder with which it is associated, the temperature in the combustion chamber should be kept as high as possible in order to facilitate the starting of the combustion engine, to insure proper preparation and heating of the fuel and to favor the ignition and combustion of the fuel. In the case of internal combustion engines having combustion chamber bodies or structures mounted in the heads when the heads are cast, there exists an intimate contact between the part of the cylinder head surrounding the outer surface of the body or structure forming the combustion chamber. Consequently, as the cylinder head cools, a rapid heat transfer takes place from the combustion chamber body into the cylinder head resulting in a considerable decline in the temperature of the combustion chamber itself. This loss of heat by the combustion chamber body makes starting of the engine more difficult and adversely affects the course of the combustion in the combustion chamber and engine cylinder associated therewith.

According to the invention, these difficulties are avoided by providing a cast cylinder head in which the body or structure forming the combustion chamber is heat insulated from the part of the cylinder head surrounding it. Therefore, in manufacturing the improved cylinder heads, according to the invention, a layer of heat insulating material is applied to the outer surface of the completed combustion chamber structure prior to its inclusion in the cylinder head when the latter is cast. When the cylinder head is formed in this way the combustion chamber structure is shielded from the cast metal of the cylinder head and the flow of heat into the latter is prevented or greatly reduced. Since the seat for the fuel nozzle, which is mounted in the cylinder head and in a part of the body forming a combustion chamber, should be kept as cool as possible, the layer of heat insulating material is applied to the parts of the body forming the combustion chamber which are remote from the seat for the fuel nozzle, leaving the parts adjacent to the seat for the fuel nozzle without a coating or layer of insulating material.

The cooling of the fuel nozzle seat can be further enhanced, according to the invention, by providing the portion of the body forming the combustion chamber, in the region of the nozzle seat, with ribs extending into the metal of the cast head. Heat will, therefore, be more readily transmitted from the portion of the nozzle seat associated with the combustion chamber than otherwise would be the case.

According to the invention the layer of heat insulating material may be formed of graphite or ceramic materials mixed with a binding agent.

Two illustrative examples of the invention are shown in the accompanying drawings forming a part of this application, and in which.

Figure 1:
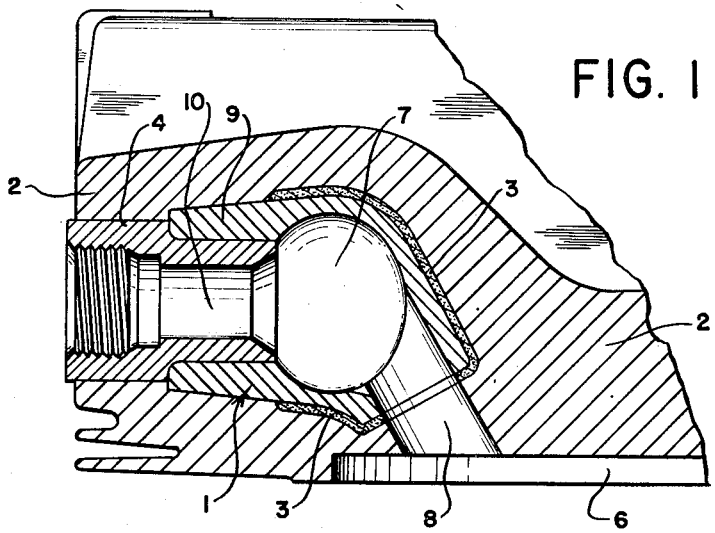
Fig. 1 is a broken central vertical sectional view through the combustion chamber of an air-cooled cylinder head of an injection type internal combustion engine constructed according to the invention.

The cylinder head structure shown in Fig. 1 of the drawings comprises a hollow body or structure 1 defining a combustion chamber, said body being enclosed within a cast metal cylinder head 2. A layer of insulating material 3 surrounds the body 1 so as to insulate it from the metal of the cast head 2. In the structure shown, the head 2 is provided with a seat 4, for a fuel injection nozzle, the seat having a portion mounted in the cast metal of the head 2 and a tubular portion extending into an inlet neck portion of the body 1 forming the combustion chamber. In making the structure shown in Fig. 1, care must be taken to leave the part of the body 1 in the region of the seat 4 uninsulated so that heat may be readily transmitted from the seat to the metal of the head 2, thereby keeping the seat 4 relatively cool.

According to the showing in Fig. 1, it will be understood that the head 2 is mounted upon a cylinder of an internal combustion engine and that the cylindrical portion 6 directly overlies the engine cylinder. Fuel injected through the nozzle, normally mounted in the nozzle seat 4, passes into a combustion chamber 7, formed by the body 1, where combustion takes place, the products of combustion flowing therefrom through an outlet 8 into the engine cylinder. In this structure, it will be understood that the inlet portion 9 of the body 1 is not insulated from the metal of the head 2 since the tubular portion 10 of the seat 4 extends into this part of the body 1 and should be allowed to cool.

Figure 2:
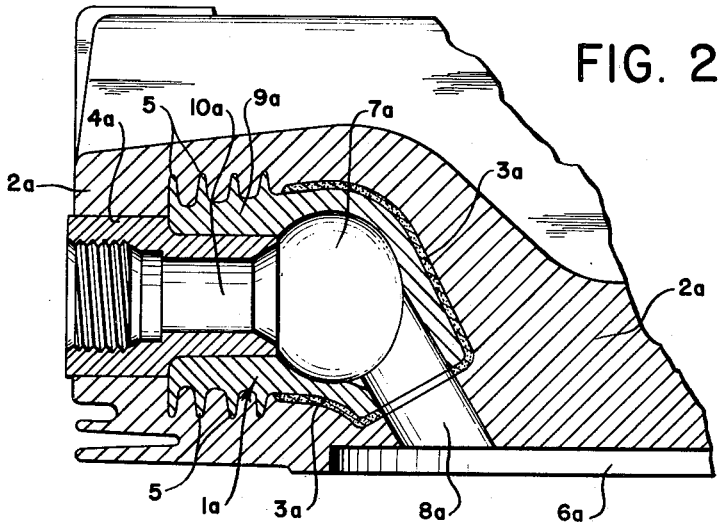
Fig. 2 is a view similar to that of Fig. 1 showing a modified form of construction.

In the modified form of the structure shown in Fig. 2, the parts are in general the same as shown in Fig. 1 and are referred to by the same reference characters plus the letter *a*. The structure here shown, however, differs in that the portion 10a of the body 1a is provided with projections or annular ribs 5 which extend outwardly into the metal of the cast head 2a for the purpose of promoting or accelerating the heat transfer from the inlet portion 9a and the tubular section 10a.

In manufacturing cylinder heads of the type described above in accordance with the features of the invention, the structure or body 1, or 1a, is formed of suitable material and then coated with a layer of heat insulating material 3, or 3a, covering the portions shown in the drawings. The heat insulating material preferably consists of solid substances such as graphite powder or ceramic powder which is mixed with a binding agent, such as oil, turpentine or other suitable material to form a paste, this paste being applied to the external surface of the body 1, or 1a. The layer of paste insulating material is dried and thereafter this chamber structure is inserted in the mold in which the cylinder head is to be cast. The body 1, or 1a, may be inserted and held in place by the use of suitable cores in the usual manner. As soon as this is done, the molten metal for forming the cylinder head is poured into the mold so that the chamber with its layer of heat insulating material is enclosed in the cylinder head casting. In the casting operation, the nozzle seat may likewise be in place as shown and included in the cast head, or it may be inserted afterward if a core is used in its place during the casting of the head.

Depending upon the kind of insulating paste employed, it is possible to carry out the method without drying the paste. Under such circumstances, the binding agent will evaporate during the casting operation, leaving a solid heat resisting layer of heat insulation between the body 1 or 1a and the metal 2 which shields the combustion chamber from the metal of the cylinder head so that there will be no noticeable drop in temperature in the combustion chamber. The combustion chamber will, therefore, heat up rapidly on starting and will remain hot.

It will be understood that the specific structures shown in the drawings and described above are merely illustrative of cylinder head structures made in accordance with the present invention, and that the invention is not limited to these particular forms or to the particular form of the layer of heat insulating material. For example, the layer of insulating material may, to a great extent, consist of pores between particles of the heat insulation, such pores being filled with air, or gases or vapors which are formed from the paste during the casting operation. The present invention is equally suitable for application to air-cooled and water-cooled internal combustion engines.

It is also to be understood that a variety of suitable materials may be employed in forming the layer of heat insulating material. In addition to the substances mentioned above, soot or carbon may be used.

I claim:

1. A cast metal cylinder head for internal combustion engines of the fuel injection type having embedded therein a hollow combustion chamber structure provided with a tubular fuel inlet portion and a combustion gas outlet portion, said combustion chamber structure being held in place by the cast metal of the cylinder head and constituting a fixed part of the cylinder head, a layer of heat insulating material surrounding the combustion chamber structure except for the tubular fuel inlet portion for insulating said chamber structure from the cast metal of the cylinder head, the cast metal of the cylinder head being in intimate contact with said tubular inlet portion of the combustion chamber structure and said layer of heat insulating material, and a tubular fuel nozzle seat member having an inner portion extending into and fitting the inside wall of the tubular fuel inlet portion of the combustion chamber structure, a portion of said tubular fuel nozzle seat member extending outwardly from the tubular inlet portion of the combustion chamber with its outer surface in direct intimate contact with the cast metal of the cylinder head, whereby heat is rapidly transferable from the tubular inlet portion of the combustion chamber structure and the tubular fuel nozzle seat member to the cast metal of the cylinder head.

2. A cast metal cylinder head for internal combustion engines of the fuel injection type having embedded therein a hollow combustion chamber structure provided with fuel inlet and combustion gas outlet portions, said combustion chamber structure being held in place by the cast metal of the cylinder head, a layer of heat insulating material surrounding the combustion chamber structure except for the fuel inlet portion for insulating said chamber structure from the cast metal of the cylinder head, the cast metal of the cylinder head being in intimate contact with said inlet portion of the combustion chamber structure and said layer of heat insulating material, a fuel nozzle seat extending into the inlet portion of the combustion chamber structure and in intimate contact therewith, and integral projections on said inlet portion extending into the cast metal of the cylinder head in intimate engagement therewith, thereby providing a cylinder head structure in which heat is rapidly transferable from said inlet portion of the combustion chamber structure to the cast metal of the cylinder head.

3. A cast metal cylinder head for internal combustion engines as claimed in claim 2, in which said projections comprise annular ribs or fins on the outer surface of the inlet portion of said combustion chamber structure.

References Cited in the file of this patent

UNITED STATES PATENTS

| | | |
|---|---|---|
| 1,025,817 | Luckenbach | May 7, 1912 |
| 1,110,947 | Lampert | Sept. 15, 1914 |
| 1,512,295 | Massey | Oct. 21, 1924 |
| 1,649,274 | Williams | Nov. 15, 1927 |
| 1,798,260 | Hehr | Mar. 31, 1931 |
| 2,003,587 | Fahlman | June 4, 1935 |
| 2,057,318 | Schwaiger | Oct. 13, 1936 |
| 2,225,807 | Towler | Dec. 24, 1940 |
| 2,304,067 | Anderson | Dec. 8, 1942 |
| 2,316,269 | Maruhn | Apr. 13, 1943 |
| 2,332,928 | Pischinger et al. | Oct. 26, 1943 |

FOREIGN PATENTS

| | | |
|---|---|---|
| 678,446 | Germany | July 15, 1939 |